United States Patent Office 2,739,076
Patented Mar. 20, 1956

2,739,076

PRODUCT AND PROCESS

Ralph K. Iler, Wilmington, Del., assignor to E. I. du Pont de Nemours and Company, Wilmington, Del., a corporation of Delaware No Drawing. Application March 6, 1952,
Serial No. 275,234

7 Claims. (Cl. 106—308)

This invention relates to surface-modified finely divided siliceous solids and to their preparation. It is more particularly directed to pulverulent solids consisting essentially of inorganic siliceous particles having an average specific surface area of at least 1 square meter per gram, having chemically bound to the silicon atoms on the surface of said particles at least 100 —OROH group per 100 square millimicrons of surface area of the siliceous solid, where R is a divalent hydrocarbon radical having from 2 to 18 carbon atoms in which at least one of the carbon atoms attached to oxygen is also attached to at least one hydrogen, the total number of carbon atoms of said radical being no greater than twice the number of carbon atoms separating the oxygen atoms of the —OROH group.

This application is a continuation-in-part of my copending U. S. application, Serial No. 590,728, filed April 27, 1945, now abandoned.

The products according to the present invention are a specific kind of pulverulent solids which I refer to hereafter as estersils. Estersils are solids made by chemically reacting alcohols with certain siliceous solids. The reaction I have called esterification and the chemically bound —OROH groups resulting therefrom I have called substituted ester groups.

For a detailed description of estersils prepared from primary and secondary unsubstituted monohydric alcohols, reference is made to my copending U. S. application, Serial No. 171,759, filed July 1, 1950, now abandoned or to my United States Patent 2,657,149, issued October 27, 1953, as a continuation in part of said application Serial No. 171,759, in which estersils of that class are claimed.

The products of this invention can be made by chemically reacting a pulverulent solid material consisting essentially of substrate particles of inorganic siliceous material having an average specific surface area of at least 1 square meter per gram with an excess of glycol of the formula

HO—R—OH where R is a divalent hydrocarbon radical having from 2 to 18 carbon atoms in which at least one of the carbon atoms attached to oxygen is also attached to at least one hydrogen atom and in which the total number of carbon atoms present is not more than twice the number of carbon atoms separating the hydroxyl groups. After the reaction of one of the hydroxyl groups of the glycol molecules with the silica surface, the remaining hydroxyl group is substantially exposed so as to render the product hydrophilic.

THE SUBSTRATE

The materials used to form the skeleton or internal structure, the so-called substrate, of the products of my invention are solid inorganic siliceous materials. They contain substantially no chemically bound organic groups. They have reactive surfaces which I believe to result from surface silanol (—SiOH) groups. The substrate materials can be mineral or synthetic in origin. They can be amorphous silica. They can be water-insoluble metal silicates. They can also be water-insoluble metal silicates coated with amorphous silica.

The substrate particles are aggregates of ultimate units. They have at least one dimension of at least 150 millimicrons. Thus, they are in a supercolloidal state of subdivision. Preferably, the substrate particles are coherent aggregates, that is, they are made up of tiny ultimate units which are so firmly attached to each other that they are not readily separated by simple stirring in fluid medium.

For the purposes of this invention substrate particles in which the ultimate units are quite uniform and have an average diameter of ten to 100 millimicrons or ultimate units below 10 millimicrons diameter joined in any very open network are preferred. The coherent aggregates should have an average diameter of at least one micron.

It is preferred that the inorganic siliceous solids used are porous, that is, they have exposed surfaces in the interior of the particle which are connected to the exterior so that liquids and gases can penetrate the pores and reach the exposed surfaces of the pore walls. In other words, the solid forms a three-dimensional network or webwork through which the pores or voids or interstices extend as a labyrinth of passages or open spaces.

Especially preferred are porous inorganic siliceous solids having average pore diameter of at least four millimicrons. The large pores afford easy access for alcohol molecules in the subsequent esterification to give the products of the invention.

The substrate particles have large surface areas in relation to their mass. The term used herein and the one normally so used in the art to express the relationship of surface area to mass is "specific surface area." Numerically, specific surface area will be expressed in square meters per gram (m.²/g.).

According to the present invention, the substrate particles have an average specific surface area of at least 1 square meter per gram and preferably the average specific surface area is at least 25 m.²/g. In the case of precipitated amorphous silica, a preferred material, there is an optimum range of about 200 to 400 m.²/g., based on the fact that in this range the supercolloidal particles or aggregates can be obtained in a dry state without bringing about a considerable collapse of the porous structure by replacing the water with a water-miscible organic solvent such as acetone and then drying. This powder is especially suitable for subsequent esterification. It is, of course, possible to produce very voluminous aerogels by processes of the prior art, having surface areas of from 200 to 900 m.²/g. Such highly porous forms of silica can be surface-esterified by the process of this invention.

Specific surface area, as referred to herein, is determined by the accepted nitrogen adsorption method described in an article "A new method for measuring the surface areas of finely divided materials and for determining the size of particles" by P. H. Emmett in Symposium on New Methods for Particle Size Determination in Sub-Sieve Range, published by the American Society for Testing Materials, March 1951, page 95. The value of 0.162 square millimicron for the area covered by one surface adsorbed nitrogen molecule is used in calculating the specific surface areas.

Pore diameter values are obtained by first determining pore volume from nitrogen adsorption isotherms as described by Holmes and Emmett in Journal of Physical and Colloid Chemistry 51, 1926 (1947). From the volume figure, the diameters are obtained by simple geometry assuming cylindrical pore structure.

Determinations of gross particle size and shape of substrate material are suitably made by a number of standard methods whose choice for use in a particular case depends upon the approximate size and shape of the particles and the degree of accuracy desired. Thus, for coarse materials, the dimensions of individual particles or coherent aggregates can be determined with the unaided eye and ruler or calibers. For more finely powdered material, the light microscope is used with a calibrated scale. For materials having a particle size in the range of from 2 or 3 microns down to 5 millimicrons, the electron microscope is used. Particle size determination using an electron microscope is described in detail by J. H. L. Watson in Analytical Chemistry 20, 576 (1948).

While various inorganic siliceous solids having the aforementioned properties can be used as substrate materials in preparation of the products of my invention, precipitated amorphous silica is particularly preferred. Such silica is characterized by X-rays as lacking crystalline structure.

The preparation of several suitable amorphous silicas is illustrated in the examples. For a detailed discussion of sources of amorphous silica for use in preparing estersils of primary and secondary alcohols, reference should be had to my copending U. S. application, Serial No. 171,759, filed July 1, 1950, now abandoned.

Instead of silica, water-insoluble metal silicates can be used as the substrate. Such metal silicates can be prepared, as is well known in the prior art, by treatment of silicas with metal salts or hydrous metal oxides, excluding those containing only alkali metal ions. Such metal silicates can be prepared so as to have a large number of silanol (—SiOH) groups on the surface of the particle. Thus metal silicates having a large proportion of metal ions on the surface may be activated for esterification by washing with acids to remove at least a portion of the metal ion and leave surface silanol groups.

Crystalline metal silicates occurring in nature can also be used. However, the proportion of silanol groups on most minerals is very small since the surfaces also contain metal hydroxy groups, silicon oxygen groups and adsorbed metal ions. Therefore, before esterification it is necessary to introduce silanol groups on the surface. Loosely adsorbed metal ions may be exchanged for hydrogen ions by washing the dilute acids or by treatment with ion exchange resins. In some cases, more vigorous treatment, such as reaction with acids at low pH and often at elevated temperatures are required to give a material which will contain a sufficient number of silanol groups in the surface to yield an organophilic product on esterification.

Alternatively or additionally, silanol groups can be introduced on the surface of metal silicates by coating them with a layer of amorphous silica. This is accomplished by treating, say, sodium silicate with an acid in the presence of the mineral silicate particles under such conditions that the silica formed will deposit as a coating on the mineral particle.

Mineral crystalline silicates which can be used in preparing the substrate particles are as follows: the asbestos minerals, such as chrysotile asbestos and serpentine (hydrous magnesium silicate) and amphiboles such as crocidolite asbestos (a sodium magnesium iron silicate), amosite (an iron silicate), tremolite (a calcium magnesium silicate), and anthothyllite (a magnesium iron silicate); clay materials, such as halloysite (an aluminum silicate), attapulgite (a magnesium aluminum silicate), hectorite (a magnesium lithium silicate), nontronite (magnesium aluminum iron silicates); the kaolins, such as kaolinite, nacrite and dickite (aluminum silicate); and bentonites, such as beidillite, saponite and montmorillonite (magnesium aluminum iron silicates); and micaceous minerals, such as phlogopite (a potassium magnesium aluminum silicate), muscovite (a potassium aluminum silicate), biotite (a potassium iron aluminum silicate) and vermiculite (a hydrous magnesium iron aluminum silicate).

THE ESTERIFYING AGENT

The inorganic siliceous solids already described react with glycols to give the products of the invention, the glycols beings present in amounts theoretically in excess of that required for esterification to occur between the silica surface and one of the hydroxyl groups of the glycol molecule. After one polar end of the glycol directs itself towards an SiOH surface group, the second hydroxyl group of each glycol molecule is constrained from approaching a second SiOH surface group due to the presence of excess glycol At elevated temperature, water splits out and the —OROH radical becomes chemically attached to the silica surface.

The glycols herein called esterifying agents are represented by the formula HO—R—OH where R is a divalent hydrocarbon radical having from 2 to 18 carbon atoms in which at least one of the carbon atoms attached to the oxygen of the hydroxyl groups is also attached to at least one hydrogen and in which the total number of carbon atoms is no greater than twice the number of carbon atoms separating the hydroxyl groups.

As examples of suitable esterifying agents there may be named ethylene glycol, trimethylene glycol, tetramethylene glycol, pentamethylene glycol, hexamethylene glycol, heptamethylene glycol, octamethylene glycol, nonamethylene glycol, decamethylene glycol, undecamethylene glycol, dodecamethylene glycol, tridecamethylene glycol, tetradecamethylene glycol, pentadecamethylene glycol, hexadecamethylene glycol, heptadecamethylene glycol, octadecamethylene glycol, 2-methyl-2,4-pentanediol, and 2,4-octanediol.

Technically, there is no upper limit to the number of carbon atoms which may be present in the esterifying agent. As a practical matter, however, the group of glycols having from 2 to 18 carbon atoms include the majority of common glycols and offer a selection of molecule sizes which should be adequate for any purpose.

Straight chain glycols containing from 2 to 6 carbon atoms are preferred because of their lower boiling points and consequent ease of handling. Additionally, they are also the most economical to use and yield a product having a low ratio of organic matter through silica.

The esterifying agent need not be a single glycol. Mixtures of glycols can be used. Thus, when a variety of surface properties is desired, a mixture of glycols may be used. And, if desired, a mixture consisting of an unsubstituted primary or secondary alcohol and a glycol can be used.

ESTERIFICATION

The siliceous substrate to be reacted with one of the hydroxyl groups of the glycol should contain surface silanol groups. Pure amorphous silica which has been in contact with moisture has such a surface. The surface must not be covered with other materials which block access to the silanol group. Metal ions on the surface of metal silicates must be exchanged for hydrogen atoms. This can be done by treatment with a hydrogen form of a cation exchange resin or by treatment with an acid as mentioned heretofore. Alternatively, the particles can be coated with a thin layer of silica. The external surface can then be reacted with alcohol.

The inorganic siliceous solid is preferably freed of extraneous material before esterification, and the pH is adjusted to avoid strong acids or alkalis in the reaction. The pH is preferably 5 to 8.

The amount of water present in the reacting mass during the esterification step has an important bearing on the degree of esterification that will be obtained. Thus, since the esterification process is an equilibruim reaction, it is ordinarily desirable to keep the water content as low as possible during the course of the reaction.

In order to esterify sufficiently to obtain a high proportion of substituted ester groups on the surface of the siliceous particles, the water in the liquid phase of the system should not exceed about 5% by weight of that phase. For maximum esterification, the water content must be kept below about 1.5%. As already mentioned, it is desirable to keep the water content as low as possible.

Because of the hindering effect of water on the esterification, if the siliceous solid to be esterified is wet, the free water must be removed either before the solid is put into the glycol or alternatively it may be removed by distillation after mixing with the glycol.

Simple air drying at temperatures of from 100 to 150° C. will remove most of the free water. Drying may be hastened by the application of vacuum. For many types of siliceous solids, however, air drying is not satisfactory because they tend to shrink to hard, compact masses upon drying from water.

Water can suitably be removed from a wet siliceous solid before esterification by displacing the water in the wet mass with a polar organic solvent such as acetone. The solvent can later be recovered.

Preferably, water is removed from wet siliceous solids prior to esterification by azeotropic distillation. Thus, water-wet cake can be mixed with a polar organic solvent such as methyl ethyl ketone and the mixture distilled until the system is freed from water. The organic solvent can then be evaporated to give a dry product for reaction with glycol.

Alternatively, the glycol which is to be used as the esterifying agent can also be used in some instances as the azeotropic dehydrating agent.

The ratio of glycol and siliceous material to be used in the esterification is limited by the fact that the glycol must be present in substantial excess to facilitate a practical rate of reaction and to constrain the second hydroxyl group of each glycol molecule from approaching a second SiOH surface group.

Preferably, sufficient glycol is used to provide a slurry of the siliceous material in alcohol which can be readily stirred. Of course, larger portions of glycols must be used when no water is removed from the system during the reaction. The reason for this being that the reaction liberates water and may exceed the maximum permissible value unless glycol is added either before or during the reaction step.

In general, it is sufficient to carry out the esterification by simply refluxing the mixture of the silica and the glycol together for a suitable length of time, for example, upwards of 2 hours. In cases where the glycol is somewhat unstable, it may be desirable to carry out the esterification at somewhat lower temperatures than the boiling point of the glycol in order to prevent the excessive decomposition in the liquid phase. A preferred method of using unstable glycols as esterifying agents comprises "heat activating" the silica and chemically reacting the glycol with the resulting surface-activated silica in acordance with the invention described and claimed in the copending U. S. application of Max T. Goebel, Serial No. 261,140, filed December 11, 1951.

In addition, when the glycol to be used is relatively low boiling, that is, less than 200° C., in order to promote more complete reaction than could be realized at the boiling point, it may be desired to carry out the esterification in the autoclave at temperatures of from 200–300° C.

The extent of the reaction is fixed more by the temperature than by the time, that is, at a suitable temperature the esterification reaction proceeds quite rapidly up to a certain point which is characteristic of the temperature and of the glycol and thereafter proceeds slowly.

The minimum reaction time and temperature in order to obtain any given extent of reaction varies with the glycol used. While it is difficult to set forth in great detail the relationship between the temperature required for any given extent of reaction and the structure of the glycol, one skilled in the art may learn from the data the general principles involved and conclude what conditions should be used for another glycol.

The temperatures substantially below about 100° C. are not suitable in most instances. Glycol can be adsorbed on the siliceous surface at such temperatures but true esterification is not obtained.

The esterification temperature should not exceed the thermal decomposition point of the glycol while in the presence of silceous solids. Nor should it exceed the point of thermal stability of the esterified siliceous materials. Preferably, the heating is not prolonged any more than is required to achieve esterification equilibrium.

After completion of the esterification, the product estersils can be removed from the unreacted glycol by conventional methods. Thus, the separation can be made by filtration in those instances where the estersils consist of particles of supercolloidal size, the estersils being retained on ordinary filter media.

Alternatively, the glycol can be vaporized by applying vacuum to the reaction vessel. Or where the glycol is one which will distill at atmospheric pressure without decomposition, simple distillation can be used. In the case of higher glycols which are not readily distilled, except under very high vacuum, the glycol can be extracted from the product with a low boiling solvent such as, for instance, methyl ethyl ketone, chloroform or ether.

PROPERTIES AND USES OF THE PRODUCTS

The products of the invention are in the form of powders or sometimes lumps or cakes which are pulverable under the pressure of the finger or by a light rubbing action. The esterified inorganic siliceous solids are generally exceedingly fine, light, fluffy, voluminous powders.

The esterification reaction does not substantially change the structure of the inorganic siliceous solid or substrate which was esterified. In other words, the internal structure of the estersil, the structure to which the —OROH groups are chemically bound, has substantially the same particle size, surface area and other characteristics described previously in the discussion of the substrate material. The estersils of the invention are in a supercolloidal state of subdivision.

The products of the invention can be hydrophilic or organophilic depending on the particular glycol employed. In most instances the products are hydrophilic due to the unreacted hydroxyl groups present in an exposed position on the hydrocarbon chain. When glycols containing a substantial number of carbon atoms, say 12 or so, the hydrocarbon chain may render the product organophilic.

By the term "organophilic" I mean that when a pinch of estersil is shaken in a two-phase liquid system of water and n-butanol in a test tube the product will "wet" into the n-butanol phase in preference to the water-phase.

In the case of the preferred glycols, it is possible to force substantially more than 100 —OROH groups, say 200 to 400, to react per 100 square millimicrons of surface area of the siliceous substrate by using severe reaction conditions, care being taken not to decompose the glycol or the resulting substituted ester group.

The number of ester groups for 100 square millimicrons of siliceous substrate surface is calculated from the expression:

$$\text{Surface area} = \frac{6.02 \times 10^{23} \times C}{12n \times S_n \times 10^{18}} = \frac{50,200 \times C}{n \times S_n}$$

where $C$ is the weight of the carbon in grams attached to 100 grams of substrate; $n$ is the number of carbon atoms in the —OROH groups; $S_n$ is the specific surface area in m.$^2$/g. of the substrate as determined by nitrogen adsorption.

Where the sample to be analyzed is one in which the type of glycol is unknown, the sample can be decomposed with an acid and the glycol can be recovered and identified. The specific surface area of the substrate can be determined by first burning off the ester groups, as for example, by slowly heating the estersil in a stream of oxygen up to 500° C. and holding it at that temperature for a period of about three hours and then rehydrating the surface of the particles by exposure to 100% relative humidity at room temperature for several hours and finally determining the surface area of the remaining solid by nitrogen adsorption method.

In the products of the invention the —OROH groups are chemically bound to the substrate. The products should not be confused with compositions in which an alcohol is merely physically adsorbed on the surface of the siliceous solid. Adsorbed glycols can be removed by heating the material at relatively low temperature, for example, 150° C. under high vacuum, say $10^{-5}$ millimeters of mercury for a period of one hour. In contrast, the products of my invention are stable under such treatment. Neither can the ester groups be removed by washing with hot methyl ethyl ketone or similar solvents or by prolonged extraction in a Soxhlet extractor. In case of ordinary physical adsorption the glycol is displaced by such treatment.

The products of the invention are useful as fillers for greases, plastic material and elastomer compositions such as silicone rubbers. Because of their hydrophilic nature, the products are used in rubber latex compositions.

The invention will be better understood by reference to the following illustrative examples:

Example 1

A silica powder is obtained by the gelation of a commercially available 30% silica sol consisting of 17 millimicron colloidal particles and known as "Ludox" Colloidal Silica and by drying the resulting gel at a temperature of 100° C. for a period of twenty-four hours at a pH of about 4.5. Products of this character are described and claimed in the copending application of Max F. Bechtold and Omar E. Snyder, Serial No. 256,142, filed November 13, 1951, now abandoned.

The dried material, which is in the form of coherent aggregates, ultimate units of dense, amorphous silica, is dispersed to a free-flowing powder by the use of a micropulverizer.

A portion of the aforementioned powder is heated in a muffle furnace in the presence of air for a period of about an hour at a temperature of 600° C. in accordance with the invention described and claimed in the copending U. S. application of Warren K. Lowen, Serial No. 261,139, filed December 11, 1951. The heat treatment activates the siliceous surface towards reaction with a hydroxy group.

Five parts by weight of the activated silica powder is slurried in 100 parts by volume of ethylene glycol. The resulting slurry is refluxed at a temperature of 198° C. for a period of 4¼ hours. The slurry is filtered and the surface-modified silica is collected, washed exhaustively with acetone and finally vacuum-dried at a temperature of 100° C. for a period of about sixteen hours.

The physical appearance of the resulting product is substantially unchanged from that of the unesterified free-flowing powder. The product is hydrophilic. It is found to contain 1.75% carbon as determined by chemical analysis. This indicates a degree of esterification of 250 ester groups per 100 square millimicrons of surface, based on a nitrogen surface area of 175 m.²/g.

Example 2

A sample of dried silica substantially identical with that described in Example 1 is heated in a muffle furnace in the presence of air at a temperature of 600° C. for a period of about one hour. Following the heat activation treatment, five parts of the silica is slurried in 100 parts by volume of 2-methyl-2,4-pentanediol. The slurry is refluxed for a period of four and one-quarter hours at a temperature of 198° C. The surface-esterified silica is collected by filtration, exhaustively washed with acetone and then vacuum-dried at a temperature of 100° C. for a period of sixteen hours. The dried product is a free-flowing white powder.

Upon chemical analysis, the product is found to contain 3.84% carbon which corresponds to a surface coverage of about 185 groups per 100 square millimicrons of surface area.

I claim:

1. A pulverulent solid consisting essentially of substrate particles of inorganic siliceous material in a supercolloidal state of subdivision having an average specific surface area of from 1 to 900 square meters per gram, the particles being made up of ultimate units having an average diameter of up to about 100 millimicrons joined together into aggregates having at least one dimension of at least 150 millimicrons and an average diameter of at least one micron, and having chemically bound to the silicon atoms on the surface of said particles at least 100 —OROH group per 100 square millimicrons of surface area of the siliceous material, where R is a divalent hydrocarbon radical having from 2 to 18 carbon atoms in which at least one of the carbon atoms attached to oxygen is also attached to at least on hydrogen atom, the total number of carbon atoms of said radical being no greater than twice the number of carbon atoms separating the oxygen atoms of the —OROH group.

2. A powder consisting essentially of substrate particles of amorphous silica in a supercolloidal state of subdivision having an average specific surface area of from 25 to 900 square meters per gram, the particles being made up of ultimate units having an average diameter of up to about 100 millimicrons joined together into aggregates having at least one dimension of at least 150 millimicrons and an average diameter of at least one micron, and having chemically bound to the silicon atoms on the surface of said particles at least 100 —OROH groups per 100 square millimicrons of surface area of substrate surface, where R is a divalent hydrocarbon radical having from 2 to 18 carbon atoms in which at least one of the carbon atoms attached to oxygen is also attached to at least one hydrogen atom, the total number of carbon atoms of said radical being no greater than twice the number of carbon atoms separating the oxygen atoms of the —OROH group.

3. A powder consisting essentially of substrate particles of amorphous silica in a supercolloidal state of subdivision having an average specific surface area of from 200 to 900 square meters per gram, having an average pore diameter of at least 4 millimicrons, and having chemically bound to the silicon atoms on the surface of said particles at least 100 —OROH group per 100 square millimicrons of surface area of the siliceous material, where R is a divalent hydrocarbon radical having from 2 to 18 carbon atoms in which at least one of the carbon atoms attached to oxygen is also attached to at least one hydrogen atom, the total number of carbon atoms of said radical being no greater than twice the number of carbon atoms separating the oxygen atoms of the —OROH group.

4. A powder consisting essentially of substrate particles of amorphous silica in a supercolloidal state of subdivision having an average specific surface area of from 200 to 900 square meters per gram, having an average pore diameter of at least 4 millimicrons, and having chemically bound to the silicon atoms on the surface of said particles at least 100 —OROH group per 100 square millimicrons of surface area of the siliceous material, where R is a divalent hydrocarbon radical having from 2 to 6 carbon atoms in which at least one of the carbon atoms attached to oxygen is also attached to at least one hydrogen atom, the total number carbon atoms of said radical being no greater than twice the number of carbon atoms separating the oxygen atoms of the —OROH group.

5. A process which comprises the step of chemically reacting a glycol of the formula HOROH in which R is a divalent hydrocarbon radical having from 2 to 18 carbon atoms, wherein at least one carbon atom attached to oxygen is also attached to at least one hydrogen, the total number of carbon atoms of said radical being no greater than twice the number of carbon atoms separating the oxygen atoms of the —OROH group, said gycol being present in substantial excess, with an inorganic siliceous material in a super-colloidal state of subdivision, in the form of particles made up of ultimate units having an average diameter of up to about 100 millimicrons joined together into aggregates having at least one dimension of at least one micron, having an average specific surface area of from 1 to 900 square meters per gram, and having a reactive surface containing groups selected from the class consisting of silanol and heat-activated silicon-oxygen groups, while maintaining the water content of the system below about 5 per cent by weight of the glycol in the system and the temperature in the range from 100° C. to the thermal decomposition temperature of the glycol.

6. A process which comprises the step of chemically reacting a glycol of the formula HOROH in which R is a divalent hydrocarbon radical having from 2 to 18 carbon atoms, wherein at least one carbon atom attached to oxygen is also attached to at least one hydrogen, the total number of carbon atoms of said radical being no greater than twice the number of carbon atoms separating the oxygen atoms of the —OROH group, said glycol being present in substantial excess, with amorphous silica in a supercolloidal state of subdivision, in the form of particles made up of ultimate units having an average diameter of up to about 100 millimicrons joined together into aggregates having at least one dimension of at least one micron, having an average specific surface area of from 1 to 900 square meters per gram, and having a reactive surface containing groups selected from the class consisting of silanol and heat-activated silicon-oxygen groups, while maintaining the water content of the system below about 5 per cent by weight of the glycol in the system and the temperature in the range from 100° C. to the thermal decomposition temperature of the glycol.

7. A process which comprises the step of chemically reacting a glycol of the formula HOROH in which R is a divalent hydrocarbon radical having from 2 to 18 carbon atoms, wherein at least one carbon atom attached to oxygen is also attached to at least one hydrogen, the total number carbon atoms of said radical being no greater than twice the number of carbon atoms separating the oxygen atoms of the —OROH group, said glycol being present in substantial excess, with an inorganic siliceous material in a super-colloidal state of subdivision, in the form of particles made up of ultimate units having an average diameter of up to about 100 millimicrons joined together into aggregates having at least one dimension of at least one micron, having an average specific surface area of from 1 to 900 square meters per gram, and having a reactive surface containing groups selected from the class consisting of silanol and heat-activated silicon-oxygen groups while maintaining the water content of the system below about 5% by weight of the glycol in the system and the temperature in the range from 100° C. to the thermal decomposition temperature of the glycol, until at least 100 —OROH groups per 100 square millimicrons of surface area of said inorganic siliceous solid are chemically bound thereto.

References Cited in the file of this patent

UNITED STATES PATENTS

| | | |
|---|---|---|
| 2,395,880 | Kirk | Mar. 5, 1946 |
| 2,438,379 | Archibald et al. | Mar. 23, 1948 |
| 2,454,941 | Pierce et al. | Nov. 30, 1948 |